United States Patent [19]  
Sheeran

[11] 3,741,984  
[45] June 26, 1973

[54] N-SULFAMOYL-2-THIOPENECARBOXA-MIDES
[75] Inventor: Patrick J. Sheeran, Wilmington, Del.
[73] Assignee: E. I. du Pont d Nemours and Company, Wilmington, Del.
[22] Filed: Aug. 19, 1971
[21] Appl. No.: 173,248

[52] U.S. Cl. .............................. 260/332.2 C, 71/90
[51] Int. Cl. ..................... C07d 63/12, C07d 63/14
[58] Field of Search ................. 260/332.2 C, 556 N

[56] References Cited
FOREIGN PATENTS OR APPLICATIONS
931,225 7/1955 Germany ........................... 260/556
940,529 2/1956 Germany ........................... 260/556

Primary Examiner—Henry R. Jiles
Assistant Examiner—Cecilia M. S. Jaisle
Attorney—Paul R. Steyermark

[57] ABSTRACT

Certain novel N-sulfamoyl-2-thiopenecarboxamides are effective herbicides especially well suited for the control of nutsedge in the presence of valuable crops. A representative herbicidal compound within the above scope is N-(tert-butylsulfamoyl)-2-thiophenecarboxamide.

5 Claims, No Drawings

N-SULFAMOYL-2-THIOPENECARBOXAMIDES

BACKGROUND OF THE INVENTION

This invention relates to novel N-(substituted sulfamoyl)-2-thiophenecarboxamides and to their use as selective germination inhibitors of certain plant species, especially of nutsedge.

While many herbicides are known and available commercially, few have been useful as nutsedge control agents. Nutsedge (*Cyperus* spp.) is a particularly difficult weed to control, especially in the presence of valuable crops, such as cucumbers, rice, soybeans, cotton and corn. There is an urgent need for an effective, selective herbicide which will control nutsedge in the presence of crops.

SUMMARY OF THE INVENTION

According to the present invention, it has been discovered that nutsedge and certain other undesirable plant species can be effectively controlled with a class of novel N-sulfamoyl-2-thiophenecarboxamides having the following formula 1:

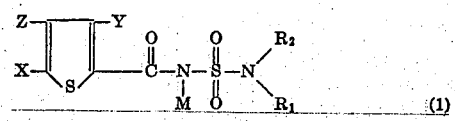

wherein $R_1$ is hydrogen or methyl;

$R_2$ is an alkyl of one to five carbon atoms, alkoxyl of one to three carbon atoms, cycloalkyl of three to five carbon atoms, alkenyl of three to four carbon atoms, or propargyl, each of these groups optionally being substituted further with one hydroxy, cyano, methoxy, methylthio, carboxy, or $CO_2R_3$ group wherein $R_3$ is an alkyl of one to three carbon atoms;

M is hydrogen, sodium, lithium, potassium, one equivalent of calcium, one equivalent of magnesium, one equivalent of barium, or

wherein each of $R_4$, $R_5$, and $R_6$ independently can be hydrogen or an alkyl of one to four carbon atoms, and $R_7$ is hydrogen, an alkyl of one to twelve carbon atoms, or benzyl;

X is hydrogen or halogen; and each of Y and Z independently is hydrogen, halogen, methyl, or halomethyl.

DETAILED DESCRIPTION OF THE INVENTION

Although the rate of application of the novel sulfamoylthiophenecarboxamide herbicides of this invention will usually be within the range of 0.5 to 10 kilograms per hectare, the exact rates of application will depend on such factors as the soil and climatic conditions and the crop which is to be protected. A skilled plant biologist or agronomist can readily select or recommend the proper rate of application in each case.

Because of ease of synthesis and high herbicidal activity, the preferred compounds of Formula (1) are those where each of $R_1$, M, X, Y, and Z is hydrogen, and $R_2$ is alkyl of one to five carbon atoms, cycloalkyl of 3-5 carbon atoms, or alkenyl of three to four carbon atoms. Especially preferred within the above preferred class are those compounds in which R is alkyl or cycloalkyl. These compounds are the most active nutsedge herbicides.

The novel N-sulfamoyl-2-thiophenecarboxamides can be prepared according to the following reaction sequence:

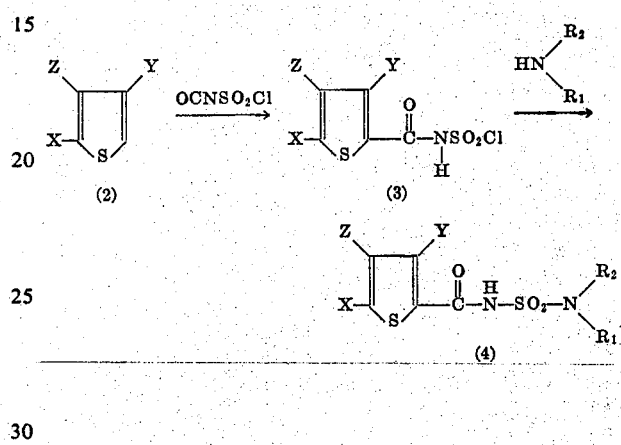

where $R_1$ and $R_2$ have the same meaning as in formula 1, above.

Thiophene as well as its halo, methyl, and halomethyl derivatives (2) are readily available commercial products; chlorosulfonyl isocyanate can be prepared by the method described by R. Graf in Chem. Ber. 89, 1071 (1956). Chlorosulfonyl isocyanate being very sensitive to moisture and very reactive with all active hydrogen-containing compounds, the first step of the reaction is carried out under anhydrous conditions and in inert solvents. A benzene solution of chlorosulfonyl isocyanate preferably is added to a solution of the thiophene in either benzene or benzene:ether mixture at about 35° to 45°C. The crude N-chlorosulfonyl-2-thiophenecarboxamide (3) can be used without purification in the second step of the reaction which is carried out in solution in acetonitrile at about 0°–10°C. It sometimes is practical to add a proton acceptor in the second reaction step to neutralize hydrochloric acid formed in the reaction of the N-chlorosylfonyl-2-thiophenecarboxamide with the amine. Such proton acceptor can be any inorganic or organic base but preferably is a tertiary amine such as trimethylamine, triethylamine, tributylamine, N,N-dimethylaniline, etc. Alternately, an excess of the amine $NHR_1R_2$ used as the reactant in the second step can serve as the proton acceptor. When it is desired to prepare a salt of the N-substituted sulfamoyl-2-thiophenecarboxamide, i.e., when M is other than hydrogen, the free N-substituted sulfamoyl-2-thiophenecarboxamide (4) is neutralized either with the appropriate alkali metal hydroxide in an alcoholic solution or with a solution of the appropriate amine or of the quaternary ammonium hydroxide in acetonitrile, tetrahydrofuran, or alcohol.

The preparation of representative novel N-substituted sulfamoyl-2-thiophenecarboxamides of the present invention is illustrated by the following Exam-

EXAMPLE 1

A solution of four parts of N-(chlorosulfonyl)-2-thiophenecarboxamide in ten parts of dry acetonitrile is added dropwise to a stirred solution of three parts of t-butylamine in 35 parts of dry acetonitrile cooled to 0°–10°C. After the addition is complete the solution is stirred at room temperature for two hours. The reaction is then cooled and filtered, followed by a dilute hydrochloric acid wash that gives four parts of the crude N-(tert-butylsulfamoyl)-2-thiophenecarboxamide, m.p. 192°–196°. Recrystallization from acetonitrile gives three parts of pure N-(tert-butylsulfamoyl)-2-thiophenecarboxamide, melting at 198°–200°C.

Anal. Calcd. for $C_9H_{14}N_2O_3S_2$: C, 41.22; H, 5.38. N, 10.68; S, 24.40.

Found: C, 40.59: H, 5.23; N, 10.56; S, 24.41.

IR 1645 cm$^{-1}$ (C=O), 1150 and 1370 cm$^{-1}$ (SO$_2$), 3300 cm$^{-1}$ (N—H).

EXAMPLE 2

A solution of twelve parts of N-(chlorosulfonyl)-2thiophenecarboxamide in 30 parts of dry acetonitrile is added dropwise to a stirred solution of nine parts of sec-butylamine in 100 parts of dry acetonitrile at 0°–5°C. After the addition is complete, the mixture is sitrred at room temperature for two hours. The reaction is then cooled and filtered. This solid is combined with the solid obtained by evaportion of the filtrate and treated with 150 ml of saturated sodium carbonate solution. Acidification of this aqueous solution with concentrated hydrochloric gives ten parts of crude N-(sec-butylsulfamoyl)-2-thiophenecarboxamide. Recrystallization from acetonitrile gives eight parts of N-(sec-butylsulfamoyl)-2-thiophenecarboxamide, melting at 175°–176°C.

Anal. Calcd. for $C_9H_{13}N_2O_3S_2$: C, 41.22; H, 5.38; N, 10.68; S, 24.40.

Found: C, 41.22; H, 5.19; N, 10.71; S, 24.80.

EXAMPLE 3

A solution of seven parts of N-(chlorosulfonyl)-2-thiophenecarboxamide in 30 parts of ether is added dropwise to a stirred solution of three parts of N,N-dimethylamine in 100 parts of dry ether at 0°–10°C. After the addition is complete the mixture is stirred at ambient temperature for two hours. The mixture is filtered and the solid dissolved in 100 parts of saturated sodium carbonate. Acidification of this aqueous solution with concentrated hydrochloric acid gives four parts of crude N-(dimethylsulfamoyl)-2-thiophenecarboxamide, melting at 158°–163°C. Recrystallization from acetonitrile or ethanol: water gives three parts of pure N-(dimethylsulfamoyl)-2-thiophenecarboxamide, melting at 164°–164°C.

Anal. Calcd. for $C_7H_{10}N_2O_3S_2$: C, 35.91; H, 4.30; N, 11.96; S, 27.32.

Found: C, 36.03; H, 4.07; N, 12.10; S, 27.44.

IR 1645 cm$^{-1}$ (C=O), 1180 and 1380 cm$^{-1}$ (SO$_2$), 3300 cm$^{-1}$ (N—H).

Example 4

A solution of ten parts of N-(chlorosulfonyl)-2-thiophenecarboxamide in 20 parts of dry acetonitrile is added dropwise to a stirred solution of seven and one-half parts of cyclopentylamine in 100 parts of dry acetonitrile at 0°–10°C. After the addition is complete, the mixture is stirred at room temperature for two hours. The mixture is filtered and this solid is combined with the solid obtained by evaporation of the reaction filtrate. This solid is dissolved in 100 parts of saturated sodium carbonate solution and then acidified with concentrated hydrochloric to give five parts of N-(cyclopentylsulfamoyl)-2-thiophenecarboxamide, melting at 163°–166°C. Recrystallization from ethanol gives five parts of pure N-(cyclopentylsulfamoyl)-2-thiophenecarboxamide, m.p. 166°–167°C.

EXAMPLE 5

A solution of ten parts of N-(chlorosulfonyl)-2-thiophenecarboxamide in 20 parts of dry acetonitrile is added dropwise to a stirred solution of five parts of isopropylamine in 100 parts of dry acetonitrile at 0°–10°C. After the addition is complete, the mixture is stirred at room temperature for two hours. The mixture is cooled and filtered. The filtrate is evaporated under a vacuum and this solid combined with the filtered solid and dissolved in 100 parts of saturated sodium carbonate solution. Acidification of this solution gives seven parts of crude N-(isopropylsulfamoyl)-2-thiophenecarboxamide, melting at 158°–162°C. Recrystallization from ethanol gives four and one-half parts of pure N-(isopropylsulfamoyl)-2-thiophenecarboxamide, m.p. 165°–166.5°C.

Anal. Calcd. for $C_8H_{12}N_2O_3S_2$: C, 38.72; H, 4.87; N, 11.29.

Found: C, 38.21; H, 5.01; N, 11.28.

IR 1635 cm$^{-1}$ (C=O), 1170 and 1340 cm$^{-1}$ (SO$_2$), 3100 cm$^{-1}$.

EXAMPLE 6

A solution of ten parts of N-(chlorosulfonyl)-2-thiophenecarboxamide in 20 parts of dry acetonitrile is added dropwise to a stirred solution of four and one-half parts of cyclopropylamine in 100 parts of dry acetonitrile at 0°–10°C. After the addition is complete, the reaction mixture is stirred at room temperature for two hours. The mixture is cooled and filtered. Evaporation of the filtrate under a vacuum gives a solid that is combined with the filtered solid and dissolved in 100 parts of saturated sodium carbonate. Acidification of this solution with concentrated hydrochloric acid gives six parts of crude N-(cyclopropylsulfamoyl)-2-thiophenecarboxamide, melting at 168°–172°C. Recrystallization from ethanol gives five parts of pure N-(cyclopropylsulfamoyl)-2-thiophenecarboxamide, m.p. 174°–175°C.

Anal. Calcd. for $C_8H_{10}N_2O_3S_2$: C, 39.03; H, 4.09; N, 11.38.

Found: C, 38.82; H, 4.26; N, 11.15.

IR 1645 cm$^{-1}$ (C=O), 1160 and 1365 cm$^{-1}$ (SO$_2$), 3120 and 3260 cm$^{-1}$.

EXAMPLE 7

A solution of six parts of 5-bromo-N-(chlorosulfonyl)-2-thiophenecarboxamide in 20 parts of dry acetonitrile is added dropwise to a stirred solution of three parts of sec-butylamine in 100 parts of dry acetonitrile at 0°–10°C. The mixture is then stirred at room temperature for two hours. The mixture is cooled and filtered. Evaporation of the filtrate under a reduced vacuum gives a solid that is combined with the filtered solid and dissolved in 100 parts of saturated sodium carbonate. Acidification of this solution with concentrated hydrochloric acid gives three parts of crude 5-bromo-N-(sec-butylsulfamoyl)-2-thiophenecarboxamide, melting at 177°–181°C. Recrystallization from ethylacetate gives two parts of pure 5-bromo-N-(sec-butylsulfamoyl)-2-thiophenecarboxamide, m.p. 181°–182°C.

Anal. Calcd. for $C_9H_{13}BrN_2O_3S_2$: C, 31.69; H, 3.81; N 8.21; Br, 23.47.

Found: C, 31.30; H, 3.95; N, 8.06; Br, 23.97.

IR 1640 cm$^{-1}$ (C=O), 1165 and 1340 cm$^{-1}$ (SO$_2$), 3200 cm$^{-1}$ (N—H).

The following N-(substituted sulfamoyl)-2-thiophenecarboxamides can be prepared by the procedure of Example 2 by substituting the listed N-(chlorosulfonyl)-2-thiophenecarboxamide and by replacing sec-butylamine with the amine listed below.

TABLE 1

| N-(chlorosulfonyl)-2-thiophenecarboxamide | Amine | Product |
|---|---|---|
| | methylamine | N-(methylsulfamoyl)-2-thiophenecarboxamide |
| " | ethylamine | N-(ethylsulfamoyl)-2-thiophenecarboxamide |
| " | n-propylamine | N-(propylsulfamoyl)-2-thiophenecarboxamide |
| " | n-butylamine | N-(butylsulfamoyl)-2-thiophenecarboxamide |
| " | iso-butylamine | N-(iso-butylsulfamoyl)-2-thiophenecarboxamide |
| " | n-pentylamine | N-(pentylsulfamoyl)-2-thiophenecarboxamide |
| " | 2,2-dimethylpropylamine | N-(2,2-dimethylpropylsulfamoyl)-2-thiophenecarboxamide |
| " | methoxyamine | N-(methoxysulfamoyl)-2-thiophenecarboxamide |
| " | ethoxyamine | N-(ethoxysulfamoyl)-2-thiophenecarboxamide |
| N-(chlorosulfonyl)-2-thiophenecarboxamide | propyloxyamine | N-(propyloxysulfamoyl)-2-thiophenecarboxamide |
| " | allylamine | N-(allylsulfamoyl)-2-thiophenecarboxamide |
| " | propargylamine | N-(propargylsulfamoyl)-2-thiophenecarboxamide |
| " | 3-amino-1-butene | N-(3-butenesulfamoyl)-2-thiophenecarboxamide |
| " | 2-cyanoethylamine | N-(2-cyanoethylsulfamoyl)-2-thiophenecarboxamide |
| " | 2-methylthioethylamine | N-(2-methylthiosulfamoyl)-2-thiophenecarboxamide |
| " | 2-methoxyethylamine | N-(2-methoxyethylsulfamoyl)-2-thiophenecarboxamide |
| " | ethanolamine | N-(2-hydroxyethylsulfamoyl)-2-thiophenecarboxamide |
| " | glycine | N-(carboxymethylsulfamoyl)-2-thiophenecarboxamide |
| " | sarcosine | N-(N-carboxymethyl-N-methylsulfamoyl)-2-thiophenecarboxamide |
| 5-chloro-N-(chlorosulfonyl)-2-thiophenecarboxamide | tert-butylamine | 5-chloro-N-(tert-butylsulfamoyl)-2-thiophenecarboxamide |
| " | methoxyamine | 5-chloro-N-(methoxysulfamoyl)-2-thiophenecarboxamide |
| " | cyclopropylamine | 5-chloro-N-(cyclopropylsulfamoyl)-2-thiophenecarboxamide |
| " | allylamine | 5-chloro-N-(allylsulfamoyl)-2-thiophenecarboxamide |
| " | 2-cyanoethylamine | 5-chloro-N-(2-cyanoethylsulfamoyl)-2-thiophenecarboxamide |
| " | 2-methoxyethylamine | 5-chloro-N-(2-methoxyethylsulfamoyl)-2-thiophenecarboxamide |
| " | ethanolamine | 5-chloro-N-(2-hydroxyethylsulfamoyl)-2-thiophenecarboxamide |
| " | 2-methylthioethylamine | 5-chloro-N-(2-methylthioethylsulfamoyl)-2-thiophenecarboxamide |
| " | glycine | 5-chloro-N-(carboxymethylsulfamoyl)-2-thiophenecarboxamide |
| 5-bromo-N-(chlorosulfonyl)-2-thiophenecarboxamide | tert-butylamine | 5-bromo-N-(tert-butylsulfamoyl)-2-thiophenecarboxamide |
| " | methoxyamine | 5-bromo-N-(methoxysulfamoyl)-2-thiophenecarboxamide |
| " | cyclopropylamine | 5-bromo-N-(cyclopropylsulfamoyl)-2thiophenecarboxamide |
| " | allylamine | 5-bromo-N-(allylsulfamoyl)-2-thiophenecarboxamide |
| " | ethanolamine | 5-bromo-N-(2-hydroxyethylsulfamoyl)-2-thiophenecarboxamide |
| " | 2-methoxyethylamine | 5-bromo-N-(2-methoxyethylsulfamoyl)-2-thiophenecarboxamide |
| " | 2-methylthioethylamine | 5-bromo-N-(2-methylthioethylsulfamoyl)-2-thiophenecarboxamide |
| " | glycine | 5-bromo-N-(carboxymethylsulfamoyl)-2-thiophenecarboxamide |
| " | sarcosine | 5-bromo-N-(carboxymethyl-N-methylsulfamoyl)- |

| | | |
|---|---|---|
| 5-iodo-N-(chlorosulfonyl)-2-thiophenecarboxamide | tert-butylamine | 5-iodo-N-(tert-butylsulfamoyl)-2-thiophenecarboxamide |
| " | methoxyamine | 5-iodo-N-(methoxysulfamoyl)-2-thiophenecarboxamide |
| " | cyclopropylamine | 5-iodo-N-(cyclopropylsulfamoyl)-2-thiophenecarboxamide |
| " | allylamine | 5-iodo-N-(allylsulfamoyl)-2-thiophenecarboxamide |
| " | ethanolamine | 5-iodo-N-(2-hydroxyethylsulfamoyl)-2-thiophenecarboxamide |
| " | 2-cyanoethylamine | 5-iodo-N-(2-cyanoethylsulfamoyl)-2-thiophenecarboxamide |
| " | 2-methoxyethylamine | 5-iodo-N-(2-methoxyethylsulfamoyl)-2-thiophenecarboxamide |
| 5-iodo-N-(chlorosulfonyl)-2-thiophenecarboxamide | 2-methylthioethylamine | 5-iodo-N-(2-methylthioethylsulfamoyl)-2-thiophenecarboxamide |
| " | glycine | 5-iodo-N-(carboxymethylsulfamoyl)-2-thiophenecarboxamide |
| " | sarcosine | 5-iodo-N-[(carboxymethyl)-N-methylsulfamoyl]-2-thiophenecarboxamide |
| " | methyl sarcosinate | 5-iodo-N-[(methoxycarbonylmethyl)-N-methysulfamoyl]-2-thiophenecarboxamide |
| " | propyl sarcosinate | 5-iodo-N-[(propoxycarbonylmethyl)-N-methylsulfamoyl]-2-thiophenecarboxamide |
| 3-methyl-N-(chlorosulfonyl)-2-thiophenecarboxamide | tert-butylamine | 3-methyl-N-(tert-butylsulfamoyl)-2-thiophenecarboxamide |
| 4-methyl-N-(chlorosulfonyl)-2-thiophenecarboxamide | tert-butylamine | 4-methyl-N-(tert-butylsulfamoyl)-2thiophenecarboxamide |
| 4-bromo-N-(chlorosulfonyl)-2-thiophenecarboxamide | tert-butylamine | 4-bromo-N-(tert-butylsulfamoyl)-2-thiophenecarboxamide |
| 3-bromo-N-(chlorosulfonyl)-2-thiophenecarboxamide | tert-butylamine | 3-bromo-N-(tert-butylsulfamoyl)-2-thiophenecarboxamide |
| 4,5-dibromo-N-(chlorosulfonyl)-2-thiophenecarboxamide | cyclopentylamine | 4,5-dibromo-N-(cyclopentylsulfamoyl)-2-thiophenecarboxamide |
| 3,4,5-tribromo-N-(chloro-sulfonyl)-2-thiophenecarboxamide | allylamine | 3,4,5-tribromo-N-(allylsulfamoyl)-2-thiophenecarboxamide |
| 4-chloromethyl-N-(chloro-sulfonyl)-2-thiophenecarboxamide | isopropylamine | 4-chloromethyl-N-(isopropylsulfamoyl)-2-thiophenecarboxamide |

Treatment of an N-(alkylsulfamoyl)-2-thiophenecarboxamide having the formula (4) above, with appropriate base gives the corresponding salt, as shown below:

TABLE II

| Compound (4) | Base | Product |
|---|---|---|
| N-(tert-butylsulfamoyl)-2-thiophenecarboxamide | NaOCH$_3$ | sodium N-(tert-butylsulfamoyl)-2-thiophenecarboxamide |
| N-(cyclopropylsulfamoyl)-2-thiophenecarboxamide | NaOCH$_3$ | sodium N-(cyclopropylsulfamoyl)-2-thiophenecarboxamide |
| N-(tert-butylsulfamoyl)-2-thiophenecarboxamide | LiOH | lithium N-(tert-butylsulfamoyl)-2-thiophenecarboxamide |
| N-(isopropylsulfamoyl)-2-thiophenecarboxamide | KOH | potassium N-(isopropylsulfamoyl)-2-thiophenecarboxamide |
| N-(tert-butylsulfamoyl)-2-thiophenecarboxamide | Ca(OH)$_2$ | hemicalcium N-(tert-butylsulfamoyl)-2-thiophenecarboxamide |
| N-(cyclopentylsulfamoyl)-2-thiophenecarboxamide | Mg(OH)$_2$ | hemimagnesium N-(cyclopentylsulfamoyl)-2-thiophenecarboxamide |
| N-(tert-butylsulfamoyl)-2-thiophenecarboxamide | Ba(OH)$_2$ | hemibarium N-(tert-butylsulfamoyl)-2-thiophenecarboxamide |
| N-(tert-butylsulfamoyl)-2-thiophenecarboxamide | triethylamine | triethylammonium N-(tertbutylsulfamoyl)-2-thiophenecarboxamide |
| N-(tert-butylsulfamoyl)-2-thiophenecarboxamide | trimethylamine | trimethylammonium |

| | | |
|---|---|---|
| N-(cyclopropylsulfamoyl)-2-thiophenecarboxamide | triethylamine | triethylammonium N-(cyclopropylsulfamoyl)-2-thiophenecarboxamide |
| N-(cyclopropylsulfamoyl)-2-thiophenecarboxamide | ammonia | ammonium N-(cyclopropylsulfamoyl)-2-thiophenecarboxamide |
| N-(tert-butylsulfamoyl)-2-thiophenecarboxamide | ammonia | ammonium N-(tert-butylsulfamoyl)-2-thiophenecarboxamide |
| N-(sec-butylsulfamoyl)-2-thiophenecarboxamide | dodecylmethylamine | dodecylammonium N-(sec-butylsulfamoyl)-2-thiophenecarboxamide |
| N-(allylsulfamoyl)-2-thiophenecarboxamide | N-methylbenzylamine | N-methyl-N-benzylammonium N-(allylsulfamoyl)-2-thiophenecarboxamide |
| 5-bromo-N-(tert-butylsulfamoyl)-2-thiophenecarboxamide | trimethylamine | trimethylammonium 5-bromo-N-(tert-butylsulfamoyl)-2-thiophenecarboxamide |

COMPOSITIONS

Compositions of the present invention which are herbicidal to nutsedge can be prepared by admixing at least one of the compounds of formula (1) with pest control adjuvants or modifiers to provide compositions in the form of granules, pellets, water-soluble and wettable powders, high-strength concentrates, aqueous dispersions and solutions in water and organic liquids.

Thus, the compounds of formula (1) can be used with a carrier such as a finely divided solid, an organic liquid, water, a wetting agent, a dispersing agent, or any suitable combination of these.

Compositions of the invention, especially liquids and wettable powders, contain as a conditioning agent one or more surface-active agents, sometimes called surfactants, in amounts sufficient to render a given composition containing the compounds of formula (1) readily dispersible in water.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1970 Annual by John W. McCutcheon, Inc.

In general, less than 10 percent by weight of the surface-active agent will be used in compositions of this invention and ordinarily the amount of surface-active agents will range from 1–5 percent but may even be less than 1 percent by weight.

A. Wettable Powders

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of formula (1) are of mineral origin.

The classes of extenders suitable for the wettable powder formulations of this invention are the natural clays, diatomaceous earth, and synthetic mineral fillers derived from silica and silicates. Most preferred fillers for this invention are kaolinites, attapulgite clay, montmorillonite clay, synthetic silicas, synthetic magnesium silicate and calcium sulfate dihydrate.

Most preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils and ditertiary acetylenic glycols. Preferred dispersants are methyl cellulose, polyvinyl alcohol, lignin sulfonates, polymeric alkylnaphthalene sulfonates, sodium naphthalene sulfonate, polymethylene bisnaphthalenesulfonate, and sodium-N-methyl-N-(long chain acid) taurates.

Wetting and dispersing agents in these preferred wettable powder compositions of this invention are usually present at concentrations of from about 0.3 weight percent to 5 weight percent. The inert extender then completes the formulation. Where needed, 0.1 weight percent to 1.0 weight percent of the extender may be replaced by a corrosion inhibitor or an antifoaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an antifoaming agent or both, the corrosion inhibitor will not exceed about 1 percent of the composition, and the antifoaming agent will not exceed about 0.5 percent by weight of the composition, both replacing equivalent amounts of the inert extender.

B. High Strength Compositions and Aqueous Dispersions

High-strength compositions generally consist of 90 to 99.5 percent active ingredient and 0.5 to 10 percent of a liquid or solid surfactant such as those described by McCutcheon in "Detergents and Emulsifiers" 1970 Annual. Such high-strength compositions can often be used in a manner similar to the wettable powders but they are also suitable for further formulations.

The aqueous dispersions are prepared by mixing together and sandgrinding an aqueous slurry of water-insoluble active ingredient in the presence of dispersing agents. Thus there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40 percent of active ingredient, from 45 to 70 percent water, with the remainder made up of surfactants, corrosion inhibitors, and suspending agents.

C. Granules and Pellets

Granules and pellets are physically stable, particulate compositions containing a compound of formula (1) which adheres to or is distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant compounds are listed by J. W. McCutcheon in "Detergents and Emulsifiers" 1970 Annual.

Suitable carriers are natural clays, some pyrophyllites and vermiculite. Suitable wetting agents are anionic or nonionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed which will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–60 mesh.

The most suitable wetting agents for the granular compositions of this invention depend upon the type of granule used. When preformed granules are sprayed with active material in liquid form the most suitable wetting agents are nonionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene gylcol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid nonionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

D. Water Soluble Powders and Solutions

Water soluble powders and solutions in water and organic liquids are prepared from the water-soluble salts of this invention. In certain cases the dry salt is dissolved in water or an organic liquid such as dimethylformamide without any other additive present, and the resulting solutions are sprayed on the locus to be treated. In other cases, finely divided inert solid extenders and surfactants are blended with the active ingredient. Upon extension with water the active component first disperses and then dissolves, leaving the inert solid in suspension to act as a tracer.

Application of the herbicidal compositions of the present invention to the control of nutsedge is illustrated in the following examples A–G, in which all parts, proportions and percentages are by weight unless otherwise noted. All of the compounds of this invention may be used at practical rates according to the procedures given in the following Examples.

EXAMPLE A

| | |
|---|---|
| N-tert-Butylsulfamoyl-2-thiophenecarboxamide | 50.0% |
| Diatomaceous earth | 46.5% |
| Methyl cellulose | 0.5% |
| Sodium alkylnaphthalenesulfonate | 3.0% |

The above components are blended, hammer-milled to pass an 0.149 mm. screen and reblended. All other compounds of this invention can be formulated in like manner.

Six kilograms of the formulation are suspended in sufficient water and uniformly broadcast-sprayed over one hectare of corn immediately after seeding. Germination and growth of nutsedge (*Cyperus rotundus* L.), a serious weed pest, is prevented or restricted while the corn crop grows vigorously. The formulation is also useful in combinations with other herbicides for broad-spectrum weed control.

EXAMPLE B

| | |
|---|---|
| N-sec-Butylsulfamoyl-2-thiophenecarboxamide | 80.0% |
| Attapulgite clay | 17.0% |
| Sodium ligninsulfonate | 1.0% |
| Finely divided synthetic silica | 1.0% |
| Dioctyl sodium sulfosuccinate | 1.0% |

The above ingredients are blended, hammer-milled to a particle size essentially below 75 microns and reblended. The following compounds can be formulated in like manner.

N-tert-butylsulfamoyl-2-thiophenecarboxamide
N-dimethylsulfamoyl-2-thiophenecarboxamide
N-cyclopentylsulfamoyl-2-thiophenecarboxamide
N-isopropylsulfamoyl-2-thiophenecarboxamide
N-cyclopropylsulfamoyl-2-thiophenecarboxamide During soybean seed bed preparation 3 to 5 kilograms per hectare of the formulation are thoroughly incorporated to a depth of 3 inches. The higher rate is used on heavy soils. The treatment prevents nutsedge growth without affecting soybean development.

EXAMPLE C

| | |
|---|---|
| N-Cyclopropylsulfamoyl-2-thiophenecarboxamide | 15.0% |
| Kaolinite | 35.0% |
| Bentonite (Ca, Mg variety) | 35.0% |
| Anhydrous sodium sulfate | 5.0% |

Calcium ligninsulfonate plus wood sugars 10.0%

The above components are blended and ground to pass an 0.149 mm. screen. The blend is then moistened with water, extruded and dried to yield pellets which can be applied directly or further subdivided into granules.

This formulation is useful for direct-band application to cucumbers during the seeding operation. The rate applied is 17 kilograms per hectare actually treated. Nutsedge control is excellent when irrigation or rainfall is received within 3 days after treatment.

EXAMPLE D

| | |
|---|---|
| N-Isopropylsulfamoyl-2-thiophenecarboxamide, Na salt | 5.0% |
| Octylphenyl polyethylene glycol ether | 1.0% |
| 15-30 mesh Attapulgite clay | 94.0% |

The active compound and surfactant are dissolved in water and sprayed on the granules while tumbling the latter. The granules are dried and are then suitable for application.

The granules are distributed at the rate of 100 to 200 kilograms per hectare around fruit trees where nutsedge (*Cyperus esculentus*) control is desired. Application is made in early spring before nutsedge growth begins. Season-long control results without injury to fruit trees.

EXAMPLE E

| | |
|---|---|
| N-Dimethylsulfamoyl-2-thiophenecarboxamide, K salt | 98.0% |
| Sodium lauryl sulfate | 1.0% |
| Finely divided synthetic silica | 1.0% |

The above components are blended and ground to pass an 0.42 mm. screen. The resulting water-soluble powder can be used directly by tank mixing with water or it can be used to prepare 20 percent active liquid concentrate by dissolving in water or dimethylformamide. In the latter two cases, the silica conditioning agent may be omitted.

The formulation is dissolved in sufficient water and sprayed at the rate of 4 kilograms per hectare. Application to soybeans immediately after seeding provides 4 to 8 weeks' control of nutsedge without reducing crop growth.

EXAMPLE F

| | |
|---|---|
| N-Cyclopentylsulfamoyl-2-thiophenecarboxamide | 30.0% |
| Sodium ligninsulfonate plus wood sugars | 15.0% |
| Hydrated attapulgite | 2.0% |
| Sodium pentachlorophenate | 1.0% |
| Dioctyl sodium sulfosuccinate | 0.5% |
| Water | 51.5% |

The above ingredients, except the water, are ground to pass an 0.30 mm. screen. The water is then added and the resulting slurry is sand-ground to a particle size essentially below 5 microns. The product remains suspended with minimal agitation when added to the spray tank and very uniform coverage is obtained on application.

The formulation is suspended in sufficient water for uniform coverage when sprayed broadcast over freshly seeded cotton at the rate of 4 kilograms active ingredient per hectare. Nutsedge is controlled 8 weeks without crop injury.

EXAMPLE G

| | |
|---|---|
| N-tert-Butylsulfamoyl-2-thiophenecarboxamide | 98.0% |
| Trimethylnonyl polyethylene glycol ether | 2.0% |

The above components are blended and hammer-milled to pass an 0.25 mm. screen to produce a high-strength composition which is suitable for further formulation or in some cases can be applied similarly to a conventional wettable powder.

Three kilograms of the formulation are suspended in sufficient water or other carrier to uniformly spray one hectare of freshly seeded or transplanted rice. The chemical treatment inhibits nutsedge emergence but allows vigorous growth of rice.

I claim:

1. A compound having the formula $$\begin{array}{c} Z \longrightarrow Y \\ X \longrightarrow S \longrightarrow C \longrightarrow N \longrightarrow S \longrightarrow N \\ \phantom{XXXXX} \| \phantom{X} \| \phantom{X} \| \phantom{XX} R_2 \\ \phantom{XXXXX} O \phantom{XX} M \phantom{X} O \phantom{XX} R_1 \end{array}$$

wherein
R₁ is hydrogen or methyl;
R₂ is selected from the group consisting of alkyl of one to five carbon atoms, alkoxy of one to three carbon atoms, cycloalkyl of three to five carbon atoms, alkenyl of three to four carbon atoms, and propargyl, and derivatives thereof substituted with one of the following groups: hydroxy, cyano, methoxy, methylthio, carboxy, and CO₂R₃, where R₃ is an alkyl of one to three carbon atoms; M is hydrogen, sodium, lithium, potassium, one equivalent of calcium, one equivalent of magnesium, one equivalent of barium, or $$\begin{array}{c} R_5 \phantom{XX} R_6 \\ \diagdown \phantom{X} \diagup \\ N \\ \diagup \phantom{X} \diagdown \\ R_4 \phantom{XX} R_7 \end{array}$$

wherein each of R₄, R₅, and R₆ independently can be hydrogen or an alkyl of one to four carbon atoms, and R₇ is hydrogen, an alkyl of one to 12 carbon atoms, or benzyl; X is hydrogen or halogen; and each of Y and Z independently is hydrogen, halogen, methyl or halomethyl.

2. A compound of claim 1, wherein each of R₁, M, X, Y, and Z in the formula thereof is hydrogen, and R₂ is alkyl having 1-5 carbon atoms, cycloalkyl having three to five carbon atoms, or alkenyl having 3-4 carbon atoms.

3. A compound of claim 2, wherein R₂ is alkyl or cycloalkyl.

4. N-(tert-Butylsulfamoyl)-2-thiophenecarboxamide, the compound of claim 3, wherein R₂ is tert-butyl.

5. N-(methylsulfamoyl)-2-thiophenecarboxamide, the compound of Claim 3, wherein R₂ is methyl.

\* \* \* \* \*